Feb. 4, 1936.  D. L. MINOTT  2,029,735
AUTOMOTIVE BODY AND FRAME
Filed Oct. 7, 1931  4 Sheets-Sheet 1
Fig. 1
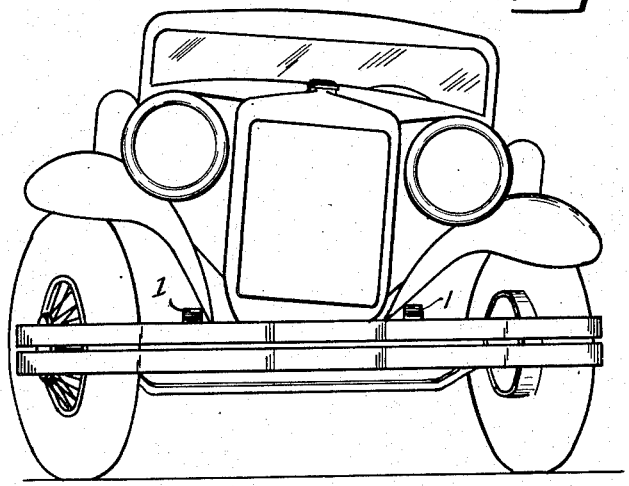
Fig. 2
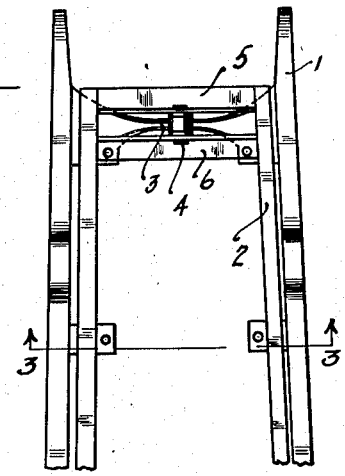
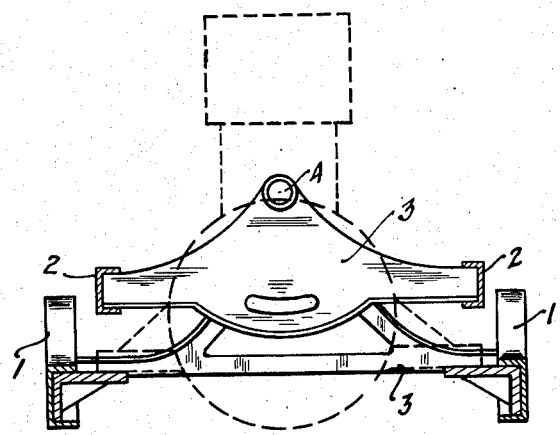
Fig. 3
Inventor
Daniel Lee Minott
By Thomas Bilyeu
Attorney

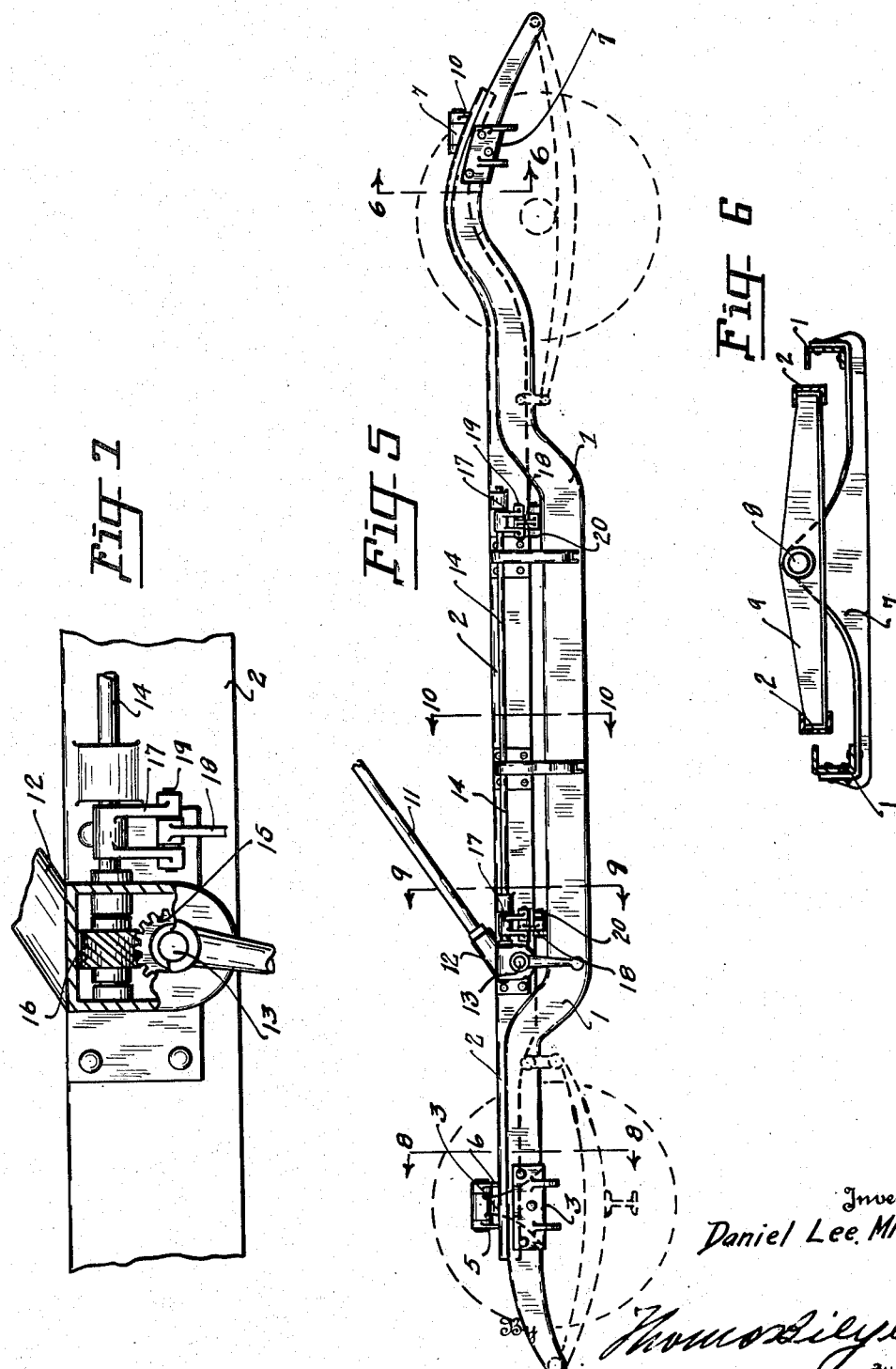

Feb. 4, 1936.  D. L. MINOTT  2,029,735
AUTOMOTIVE BODY AND FRAME
Filed Oct. 7, 1931  4 Sheets-Sheet 4

Inventor
Daniel Lee Minott

By Thomas Lilyen
Attorney

Patented Feb. 4, 1936

2,029,735

UNITED STATES PATENT OFFICE 2,029,735

AUTOMOTIVE BODY AND FRAME

Daniel Lee Minott, Portland, Oreg., assignor of one-half to Robert F. Tuggle and one-half to Herman R. Biersdorf, both of Portland, Oreg.

Application October 7, 1931, Serial No. 567,425

2 Claims. (Cl. 280—112)

My invention relates to vehicles and is primarily adapted for installation and for being used in conjunction with motor vehicles.

The invention is primarily comprised of a secondary frame, adapted for being rockably supported relative to the primary frame of the automobile. Means being provided for securing and mounting the fenders, the running boards, the body and the prime movers thereupon, and means being associated between the secondary frame and the steering gear for imparting a rocking movement to the secondary frame and to the associated parts, in direct proportion to the movement of the steering mechanism, so that the rocking movement is imparted longitudinally of the frame in direct proportion to the amount of steering movement that is imparted to the steering mechanism.

The primary object of my invention is to so construct an automobile that the body of the automobile may be moved from a horizontal plane in direct proportion to the amount of steer that is imparted to the steering wheels of the automobile.

A still further object of my invention consists in so constructing the automobile that greater comfort may be enjoyed by the passengers of the automobile in the rounding of curves and especially at the higher speeds.

And a still further object of my invention consists in so constructing the automobile that greater safety will be enjoyed by the occupants of the automobile, when the same is being driven at relatively high speeds, around the curves of highways and around the corners encountered in ordinary street traffic.

And a still further object of my invention consists in so constructing the automobile that greater stability will be encountered in the operation of the vehicle.

With these and incidental objects in view, the invention consists in certain novel features of construction and combination of parts, the essential elements of which are set forth in the appended claims, and a preferred form of embodiment of which is hereinafter shown with reference to the drawings which accompany and form a part of this specification.

In the drawings:

Fig. 1 is a front view of an automobile illustrating the body of the automobile as being tilted from the horizontal in direct proportion to the amount of steering movement that has been imparted to the front wheels of the motor vehicle.

Fig. 2 is a fragmentary, top, plan view, of the primary and secondary frames of the automobile chassis.

Fig. 3 is a sectional, end view, of the mechanism illustrated in Fig. 2, the same being taken on line 3—3 of Fig. 2, looking in the direction indicated.

Fig. 5 is a detailed sectional, side view assembly of the primary and secondary frames and of the associated elements.

Fig. 6 is a sectional, end view of the rear end of the primary and secondary frames and illustrating the support disposed between the primary and secondary frames, the same being taken on line 6—6 of Fig. 5, looking in the direction indicated.

Fig. 7 is a fragmentary, sectional, side view, of the associated elements disposed between the steering gear and the coacting parts that are adapted for imparting a tilting, or rocking movement to the secondary frame as steering movement is imparted to the steering gear.

Like reference characters refer to like parts throughout the several views.

Figure 4:
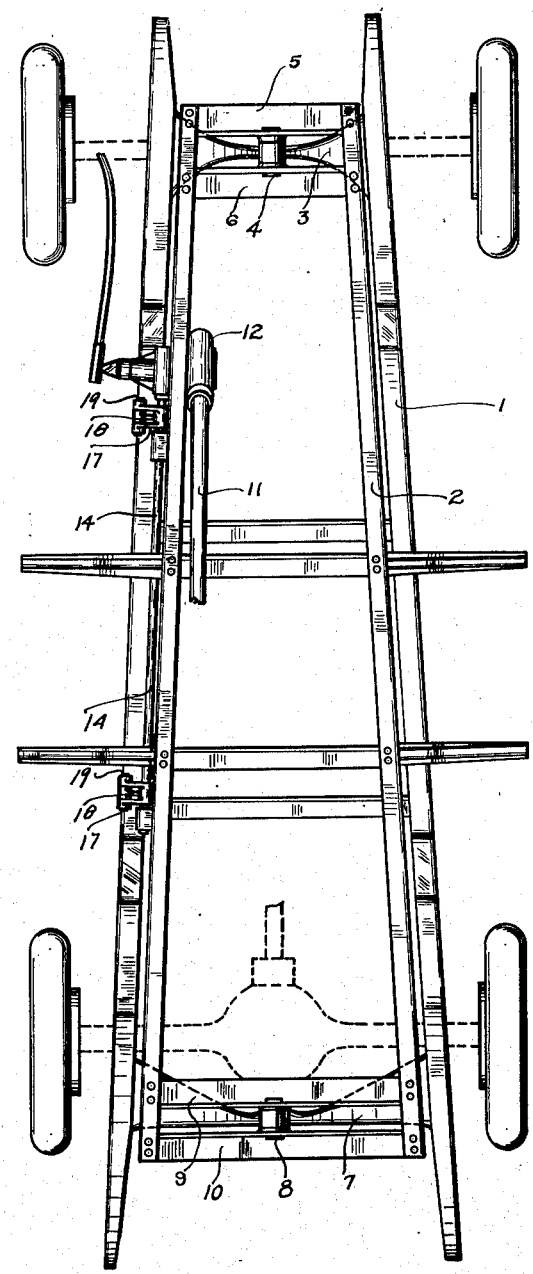
Fig. 4 is a top, plan view, of the primary and secondary frames of the automobile, illustrating the wheel and axle support therefor and the cooperating, associated elements that are disposed between the steering gear and the primary and secondary frames of the automobile.
Figure 8:
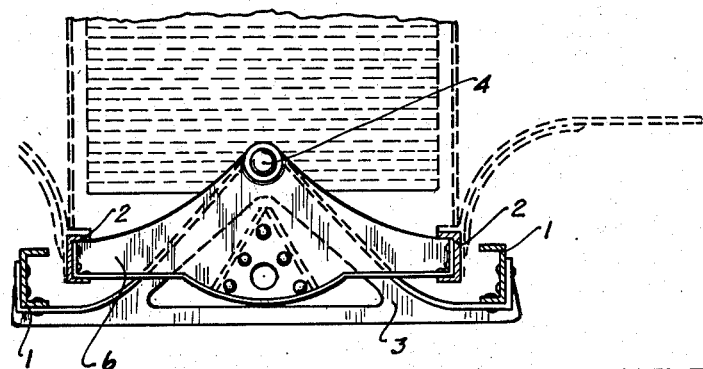
Fig. 8 is a sectional, end view, of the front end of the assembly, the same being made to illustrate the support disposed between the primary and secondary frames, the same being taken on line 8—8 of Fig. 5, looking in the direction indicated.
Figure 9:
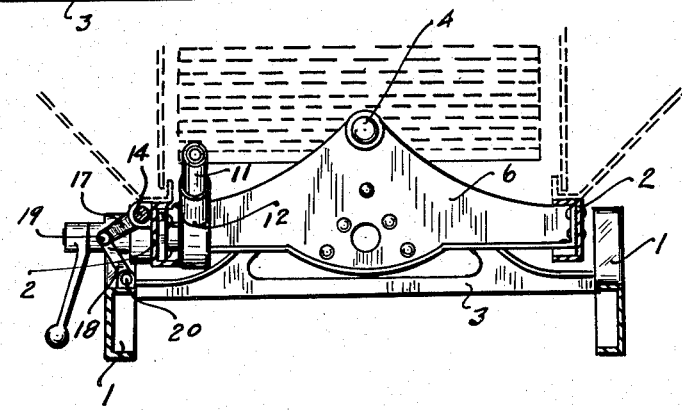
Fig. 9 is a sectional, end view, of the mechanism illustrated in Fig. 5, the same being made, primarily to illustrate the coacting mechanism disposed between the steering gear and the primary and the secondary frames; the same being taken on line 9—9 of Fig. 5, looking in the direction indicated.
Figure 10:
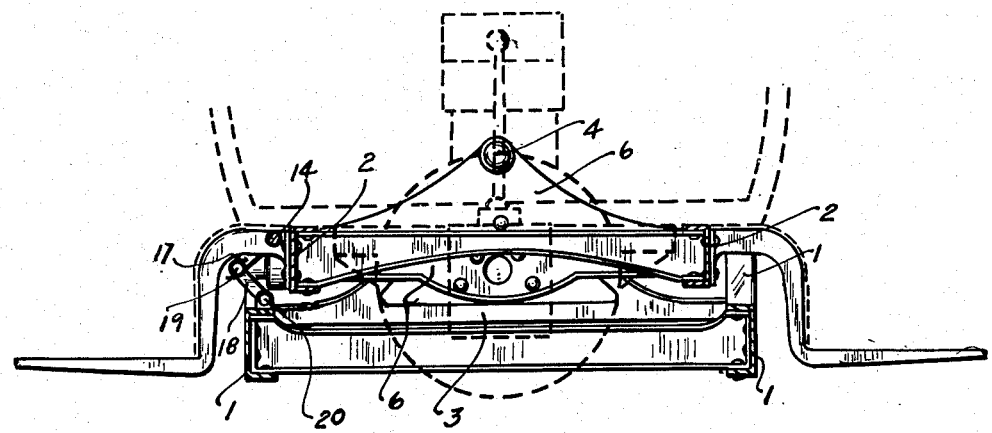
Fig. 10 is a sectional, end view, of the mechanism illustrated in Fig. 5, the same being taken on line 10—10 of Fig. 5, looking in the direction indicated.

For the purpose of this description I have illustrated my improvements as being placed in an automobile, but I do not wish to be limited to the application of my invention to automobiles as the same may be used with equal facility upon motor busses, trucks and other self-propelled vehicles that are adapted for being moved and driven at relatively high speeds.

My invention is comprised of a primary frame 1, that is adapted for being placed and supported upon the axles of vehicles in the usual manner. I place a secondary frame 2 upon the primary frame and indirectly secure the same to the primary frame. A yoke 3 is secured to the primary frame 1, upon its one end and a journal pin 4 is disposed therein that extends longitudinally of the frame and is preferably placed upon the center line of the motor vehicle that extends longitudinally of the motor vehicle. Cross bars 5 and 6 are secured within the secondary frame and are secured to the frame upon their respective ends, and the journal pin 4 is journaled within the walls of the cross bars 5 and 6. A like yoke 7 is disposed at the rear of the vehicle and a journal pin 8 is disposed within the yoke.

Cross bars 9 and 10 extend transversely of the frame, and the journal pin 8 is journaled within the walls of the cross bars 9 and 10. The axial center line of the journal pins 4 and 8 have a common center line. The fenders and the running boards are directly supported upon the secondary frame 2 and the body rests directly upon the secondary frame. The engine and its associated parts may be mounted upon the secondary frame, or the same may be mounted upon the primary frame, depending upon the character of service and use for which the device is to be adapted. The steering column 11 terminates in a gear box 12 at its lower end, and movement to the stub shaft 13 is communicated in direct proportion to the amount of movement that is imparted to the steering wheel of the steering column.

A shaft 14 is disposed longitudinally of the secondary frame. A gear 15 is mounted upon the stub shaft 13 and a gear 16 is mounted upon the shaft 14, and as the stub shaft 13 is rotated a like rotating movement will be imparted to the shaft 14. A plurality of pairs of supporting links 17 and 18 is disposed at one, or both sides of the vehicle. The link 17 is directly secured to the shaft 14 upon its one end and is hingedly secured to the link 18 through the use of a journal pin 19. The link 18 is hingedly secured to the pin 17 upon its one end through the use of the journal pin 19 and is hingedly secured to the primary frame 1 upon its oppositely disposed end through the use of a journal pin 20 so that as the shaft 14 is rotated a rocking movement will be imparted to the secondary frame in direct proportion to the movement of the steering mechanism.

The secondary frame, throughout the major portion of its length is preferably positioned slightly above the primary frame, in order to facilitate the attachments of the fenders, the running boards and the body thereto and thereupon.

As shown in Figure 5, the secondary frame 2 and all the weight carried by it is hung below the pivot points 4 and 8. This causes the secondary frame and the body carried by it to tilt to the inside of a turn by the shifting of the center of gravity in that direction. This obviously counteracts the overturning effect of the centrifugal force acting on the vehicle when negotiating a turn and especially at high speeds.

While the form of mechanism herein shown and described is admirably adapted to fulfill the objects primarily stated, it is to be understood that it is not intended to confine the invention to the one form of embodiment herein shown and described, as it is susceptible of embodiment in various forms, all coming within the scope of the claims which follow.

What I claim is:

1. In a device of the class described, the combination, in a wheeled vehicle, of a substantially rigid vehicle chassis, a pair of bearing blocks in axial alignment and disposed one at each end of the vehicle chassis, a sub-frame disposed below said bearing blocks, a pair of bearing spindles in axial alignment and disposed one at each end of the sub-frame and operatively engaging said bearing blocks to pivotally support said sub-frame with respect to the vehicle chassis, whereby the sub-frame and any load carried by it is in a state of stable equilibrium.

2. In a device of the class described, the combination of a unitary frame, two pairs of traction wheels disposed one at each end of the frame, a pair of bearing blocks disposed one at each end of the frame and in mutual horizontal and axial alignment, a unitary sub-frame disposed below the common axis of said bearing blocks, a pair of bearing spindles disposed one at each end of the sub-frame and in mutual horizontal and axial alignment and operatively engaging said bearing blocks.

DANIEL LEE MINOTT.